E. M. TRITLE.
POT LID LIFTER.
APPLICATION FILED JULY 26, 1916.

1,258,503.

Patented Mar. 5, 1918.

WITNESSES
Thos F. Knox
H. Hollingsworth

INVENTOR
Earl M. Tritle
BY Richard B. Owen.
ATTORNEY

UNITED STATES PATENT OFFICE.

EARL M. TRITLE, OF TACOMA, WASHINGTON.

POT-LID LIFTER.

1,258,503.

Specification of Letters Patent.

Patented Mar. 5, 1918.

Application filed July 26, 1916. Serial No. 111,509.

*To all whom it may concern:*

Be it known that I, EARL M. TRITLE, a citizen of the United States, residing at Tacoma, in the county of Pierce and State of Washington, have invented certain new and useful Improvements in Pot-Lid Lifters, of which the following is a specification.

This invention relates to a simple, useful, and very economical device for application to pots, pans, kettles, and the like and for attaching to the cover or lid of said device, whereby said cover or lid may be raised and lowered with great ease and convenience while the utensil is in use. The invention comprises two principal members hinged together, one of which is removably attached to the edge of the utensil, and the other temporarily clamped upon the cover or top of the same, and having a projecting handle whereby the cover may be tilted or raised when desired.

The principal object of this invention is to provide a device of the kind described, which can be manufactured very cheaply, which can be applied to and removed from the utensils whenever desired, and when in position will remain securely in place, and which will serve the purpose intended without danger of being disconnected therewith and without fear of burning the fingers when manipulating the utensil.

Figure 1:
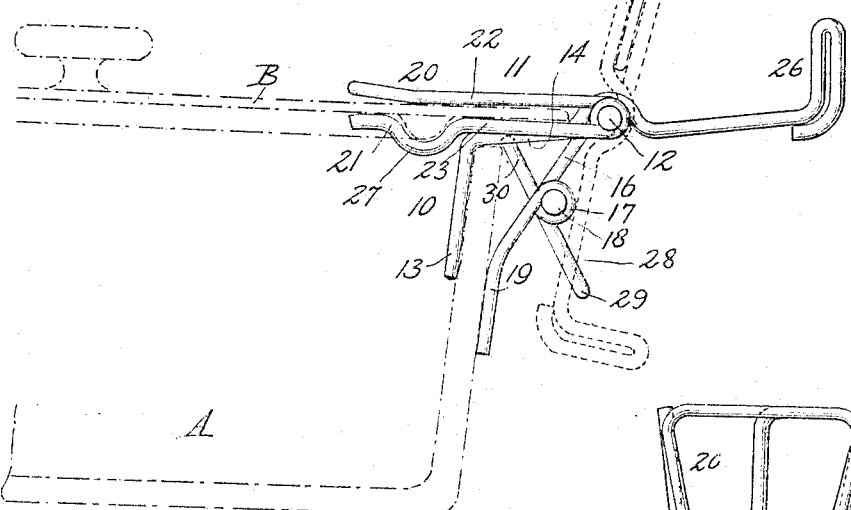
Figure 2:
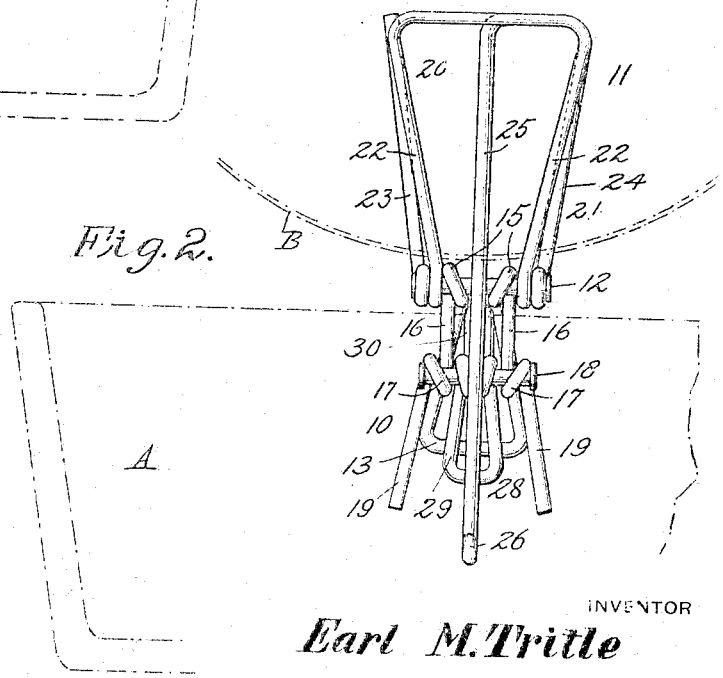

With these and other objects in view, the invention consists of the novel construction and arrangement of parts hereinafter described and illustrated in the accompanying drawing, in which:

Figure 1 is an elevation of the utensil attachment as it appears when applied to a saucepan and the cover therefor; and Fig. 2 is a view as seen from the right of Fig. 1, the cover holding member being shown in an elevated position.

In the drawings, A indicates a utensil of any desired kind, such as a saucepan, pot, or any other vessel that is provided with a cover B. Removably mounted on one side of the utensil at the top thereof, is a member 10, to which is pivoted the lid engaging member 11, the two members being made substantially of wire bent into shape and pivotally connected by a pin 12. The member 10 is in its preferred embodiment, made of a length of wire of suitable diameter and resiliency to form a stiff bracket for supporting the member 11 and cover B, and comprises a loop 13 which when the bracket is in position bears against the inner surface of the receptacle A, as shown, and projects downwardly from the top of the receptacle a suitable distance to give a secure bearing for the member 10. At the top of the receptacle, this loop 13 is bent at substantially right angles over the edge, as at 14, and projects outwardly sufficiently far to bring the hinge pin 12 away from the edge or side of the receptacle A, around which pin, the two portions of the projection 14 are twisted or bent to form eyes 15, these eyes 15, being each formed by a single turn of the wire, which then extends downwardly at an angle, as at 16, toward the loop 13 for a suitable distance below the hinge-pin 12. These members 16 are bent intermediate their length to form eyes 17 that receive a horizontal pin 18. The lower ends 19 of the members 16 are bent outwardly or away from the loop 13 far enough to be parallel with the loop when on the utensil and in connection with said loop, clamp the member 10 to the receptacle. The eyes 15, beside holding the hinge pin 12 act as coil springs to hold the loop 13 and terminal 19 against the inner and outer sides of the receptacle A.

The member 11 is pivoted by the pin 12 to the member 10 and holds the lid B securely between two inner radially projecting portions 20 and 21, the former extending over the lid and the latter under the same. The overlying portion 20 is in the form of a broad loop that extends from the hinge pin 12 radially for quite a distance beyond the edge of the lid, the two side arms 22 of the loop converging as they approach the pin 12, and at said pin are given one or more turns around said pin exteriorly of the eyes 15 and adjacent the ends of the pin and then extending forwardly beneath the loop to the inner end thereof. One of the arms 23 of the underlying lid supporting portion 21 terminates in line with the end of the loop 20, the other arm 24 extends parallel to the forward end of the loop 20 as far as the center thereof and then turns, extending backward as at 25, and over the hinge for some distance beyond the same, where it is bent upwardly and then downwardly upon itself to form a handle 26. The two arms 23 and 24 may have formed near their inner ends, depressions 27 in order that the underlying member may engage snugly with the under side of the lid, this loop serving to receive the usual depressed bead formed on the under side of the top B when the latter is made of tin.

For further securing the device on the edge of a utensil, a lever 28 is hinged on the pivot 18, one end 29 of which extends below said pivot while the other end 30 which acts within the same engages the edge of the utensil as shown, the pressure of which lever locks the two members 13 and 19 in place.

I claim:

1. In an article of the kind described, a member formed of wire and adapted to be secured to the upper edge of a utensil and projected outwardly therefrom, said member having substantially horizontal inwardly projecting arms to extend over the edge of the utensil with downwardly-turned portions to bear against the inner wall thereof, and forwardly and downwardly inclined arms to bear against the outer wall of the utensil, coils being formed at the junction of said arms and also on the inclined arms below said junction, a second member also formed of wire hinged to the coils at the junction of the arms of said first-named member and itself having inwardly projecting arms between which the cover of said utensil is held by the resiliency of said arms, a handle integral with the second named member extending outwardly beyond the pivotal axis to provide means for raising and lowering the cover, and a clamping lever pivoted to the coils of the inclined arms of the first-named member to hold said member securely in place on a receptacle.

2. In an article of the kind described, an integral bracket member formed of wire and having an arm projecting over the top of the utensil and downwardly against the inner wall thereof, and a second inclined arm bearing against the outer wall of the receptacle, coils joining said arms, said arms being adapted to be held in position by the resilience of the wire, coils also formed on the inclined arm of said bracket member, a pivot pin extending through each set of said coils, a second member formed of wire hinged on the pivot pin extending through the first-named coils and projecting inwardly to resiliently hold a cover for said receptacle, and a locking member for securing said bracket member to a utensil comprising a lever pivoted to the coils on the inclined arm and adapted to press against the outer wall of the receptacle.

In testimony whereof I affix my signature in presence of two witnesses.

EARL M. TRITLE.

Witnesses:
G. L. McDONALD,
F. HOLLYOAK.